United States Patent [19]

Hatta

[11] Patent Number: 6,092,576
[45] Date of Patent: Jul. 25, 2000

[54] TIRE HAVING ANTI-SLIP PROPERTIES

[76] Inventor: Kinzo Hatta, 36-2 Wakamiya-cho Ti, Kanazawa-shi, Ishikawa 920-0053, Japan

[21] Appl. No.: 09/153,376

[22] Filed: Sep. 15, 1998

[30] Foreign Application Priority Data

Sep. 16, 1997 [JP] Japan ..................................... 9-270444
Aug. 6, 1998 [JP] Japan ..................................... 10-236336

[51] Int. Cl.$^7$ ............................. B60C 11/00; B60C 11/14
[52] U.S. Cl. ........................................... 152/208; 152/210
[58] Field of Search .................................... 152/208, 210

[56] References Cited

U.S. PATENT DOCUMENTS

| 2,491,491 | 12/1949 | Frexgang ................................. | 152/208 |
| 2,708,470 | 5/1955 | Gramelspacher ....................... | 152/208 |
| 2,835,302 | 5/1958 | Gedge ..................................... | 152/208 |
| 2,841,199 | 7/1958 | Voelkel et al. .......................... | 152/208 |
| 3,712,358 | 1/1973 | Einarsson ................................ | 152/208 |
| 3,766,956 | 10/1973 | Ruane et al. ............................. | 152/208 |
| 3,942,572 | 3/1976 | Crandall .................................. | 152/208 |
| 4,676,289 | 6/1987 | Yi Su ...................................... | 152/210 |
| 4,815,513 | 3/1989 | Hirakawa ................................ | 152/210 |
| 5,398,742 | 3/1995 | Takebayashi ........................... | 152/208 |
| 5,411,070 | 5/1995 | Yadegar ................................... | 152/210 |
| 5,810,451 | 9/1998 | O'Brien .................................. | 152/210 |

FOREIGN PATENT DOCUMENTS

| 63-145109 | 6/1988 | Japan ..................................... | 152/210 |
| 63-215406 | 9/1988 | Japan . | |
| 3-114904 | 5/1991 | Japan ..................................... | 152/210 |
| 59-59506 | 9/1992 | Japan . | |

*Primary Examiner*—Steven D. Maki
*Attorney, Agent, or Firm*—King and Schickli, PLLC

[57] ABSTRACT

An automobile tire having an anti-skidding function and useful throughout all seasons is provided which permits the automobile to run while maintaining the anti-skidding function even if it encounters a snowless road during a travel on a snow-covered road, which does not require frequent operations of extending and retracting the spike pins and which poses no problem of pollution. Air chambers 3 are formed in the tread 2 of the tire. Branch tubes 4A of an air supply and evacuation tube 4 are connected with the air chambers 3. The tread surface has bosses 2B extending outwardly therefrom at locations corresponding to those portions 2A of the peripheral walls of the air chambers facing the tread surface, the bosses allowing portions of the tread to be bulged from and depressed into the tread surface depending on the air pressure in the air chambers. On-off valve means 6 may be provided in connecting portions between the air chambers 3 and the air supply and evacuation tube 4.

2 Claims, 9 Drawing Sheets

TIRE HAVING ANTI-SLIP PROPERTIES

BACKGROUND OF THE INVENTION

1. Field of the Invention

The present invention relates to an automobile tire useful throughout all seasons, and particularly to a tire with non-slip properties which is capable of providing an anti-skidding function during a snowfall and eliminating the need for being replaced with a nonskid tire.

1. The Prior Art

Heretofore known among tires having anti-slip properties is a tire having metallic spike pins mounted for extension and retraction from the tread surfaces.

Also known are various chain type non-skid devices made of rubber, metal, plastic or other materials separately from the tires.

SUBJECTS TO BE SOLVED BY THE INVENTION

It is a common practice in snow-falling regions to replace ordinary tires by snow tires in winter for the purpose of preventing skidding. However, the operation of such replacement involves jacking up the automobile and replacing the tires with the aid of tools, leading to the problem of requiring a long time and much labor as well as an expensive cost.

In view of this, while various chain type non-skid devices eliminating the need for the tire changing operation are available, it makes little difference in that they also require a long time and much labor for attaching and removing the chains. What is more, if the car happens to encounter a snowless road during a travel with non-skid chains attached, it would be needed to remove the chains since otherwise the chains would possibly be broken. Consequently, the very cumbersome operation of removing the chains would be involved.

Snow tires having metallic spike pins mounted for extension and retraction from the tread surfaces would make no problem during a travel on a snow-covered road, but if the car happens to encounter a snowless road, it would cause social problems such as dust and noise pollutions due to wear on the road unless the spike pins mounted for extension and retraction from the tread surfaces were immediately retracted. Consequently, the operations of extending and retracting the spike pins are frequently required.

SUMMARY OF THE INVENTION

Accordingly, it is an object of this invention to provide a tire with non-slip properties useful throughout all seasons which is capable of running while maintaining the anti-skidding function even if it encounters a snowless road during a travel on a snow-covered road and which does not require frequent operations of extending and retracting the spike pins and yet poses no problem of pollution.

In order to accomplish the foregoing object, the present invention provides a tire characterized in that air chambers defined by peripheral walls are formed in the tread of the tire, and an air supply and evacuation tube is disposed inside of the tread, the air supply and evacuation tube being connected with the air chambers, the tread surface having bosses extending outwardly therefrom at locations corresponding to those portions of the peripheral walls of the air chambers facing the tread surface, the bosses allowing portions of the tread to be bulged from and depressed into the tread surface depending on air pressure in the air chambers.

In one embodiment, on-off valve means may be provided in connecting portions between the air chambers and the air supply and evacuation tube or in the air supply and evacuation tube where the air supply and evacuation tube leads into the air chambers.

In another embodiment, the on-off valve means may comprise bladder means adapted to be inflated when it is filled with air to thereby seal the air chambers, the air supply and evacuation tube disposed inside of the tread being connected with the air chambers.

With the construction of the tire as described above according to this invention, the bosses on the tread surface side wall portion defining the air chambers are caused to project from the tread surface by filling the air chambers with air through the air supply and evacuation tube whereby the projected bosses may perform the anti-skidding function.

Since the bosses are parts of the tread, there is no possibility of the bosses abrading the road surface or generating noise. Even if the car happens to encounter a snowless road, it may continue to run while the bosses are maintained in their projected position without the need for the operation for collapsing the bosses.

After the snow-falling season passes, the tire may be switched to the normal tire mode of use by evacuating the air chambers of the air to allow the bosses to collapse into the air chambers.

In case the tire is provided with the on-off valve means, the on-off valve means is opened to introduce air into the air chambers until they are filled with air, whereupon the valve means is closed to seal off the air chambers. In this state, even if the air chambers are subjected to pressure by contacting the ground, the on-off valve means prevents the air in the air chambers from flowing back into the air supply and evacuation tube to thereby prevent collapsing of the bosses into the air chambers due to a pressure drop in the chambers.

With the on-off-valve means, it is possible to terminate fluid communication between the air chambers and the air supply and evacuation tube by introducing air from the valve actuating air tube into the bladders to inflate them. The fluid communication is resumed when the bladders are evacuated of the air and deflated.

DETAILED DESCRIPTION OF THE PREFERRED EMBODIMENTS

The embodiments of this invention will now be described with reference to the drawings.

Figure 1:
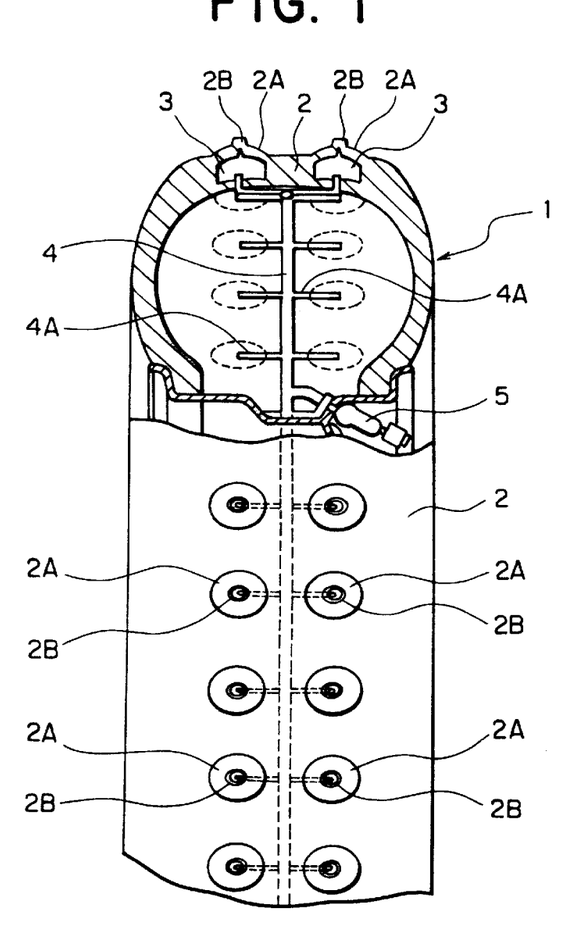
FIG. 1 is a fragmentary front view, partly in radial cross-section, illustrating a first embodiment of the tire having the anti-skidding function according to the invention as set forth in claim 1.
Figure 2:
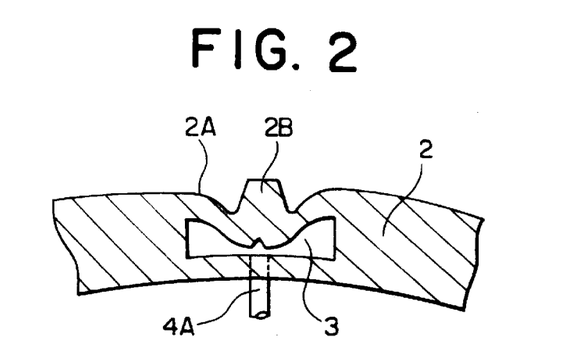
FIG. 2 is an enlarged fragmentary circumferential cross-sectional view illustrating the tire shown in FIG. 1 being in a first operative position.
Figure 3:
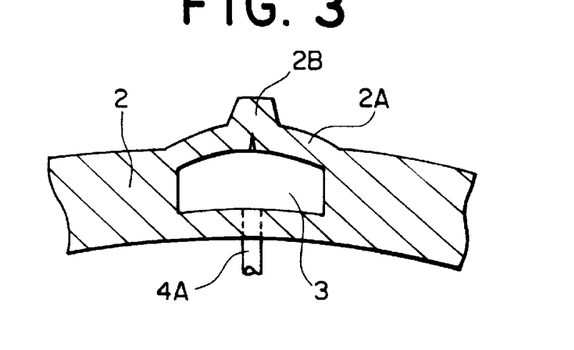
FIG. 3 is an enlarged fragmentary circumferential cross-sectional view illustrating the tire shown in FIG. 1 in a second operative position.
Figure 4:
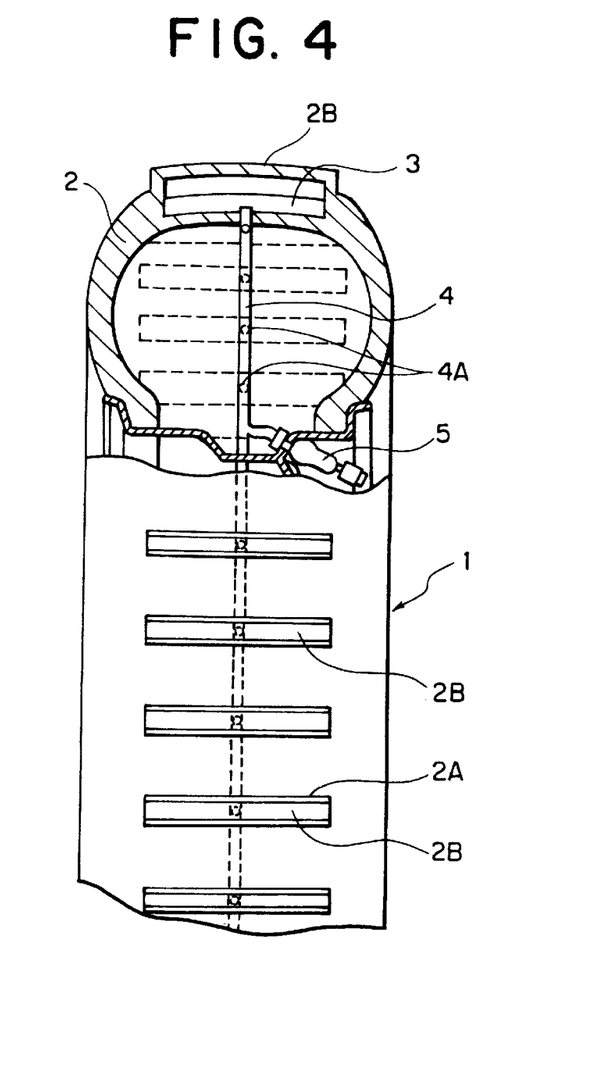
FIG. 4 is a fragmentary front view, partly in radial cross-section, illustrating a second embodiment of the tire having the anti-skidding function according to the invention as set forth in claim 1.
Figure 5:
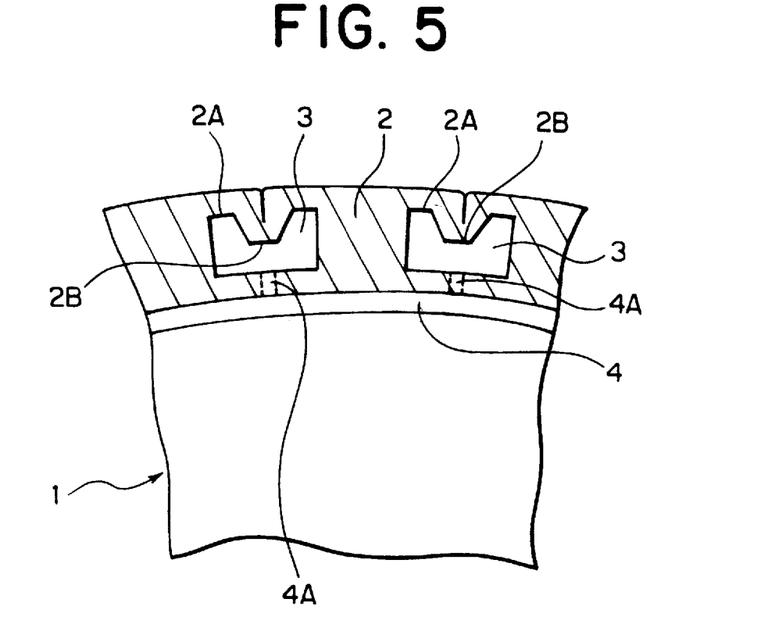
FIG. 5 is an enlarged fragmentary circumferential cross-sectional view illustrating the tire shown in FIG. 4 in a first operative position.
Figure 6:
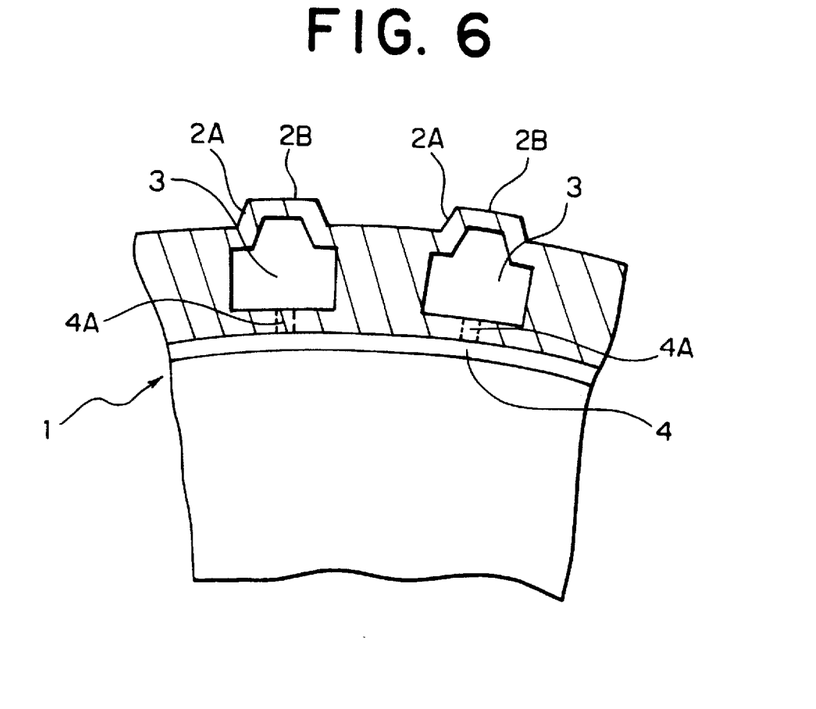
FIG. 6 is an enlarged fragmentary circumferential cross-sectional view illustrating the tire shown in FIG. 4 in a second operative position.
Figure 7:
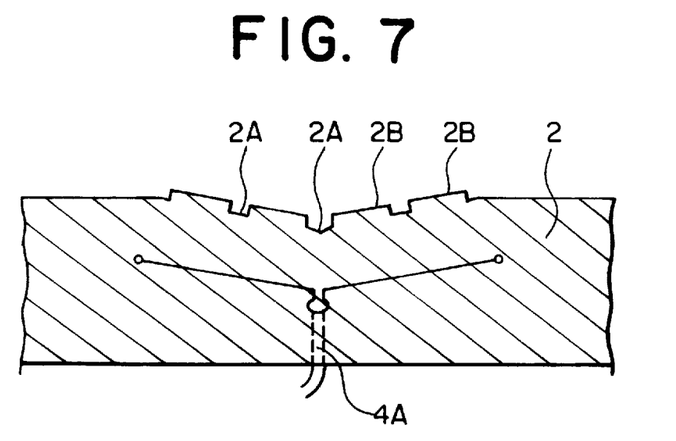
FIG. 7 is a fragmentary circumferential cross-sectional view illustrating a third embodiment of the invention as set forth in claim 1, showing the tire being in a first operative position.
Figure 8:
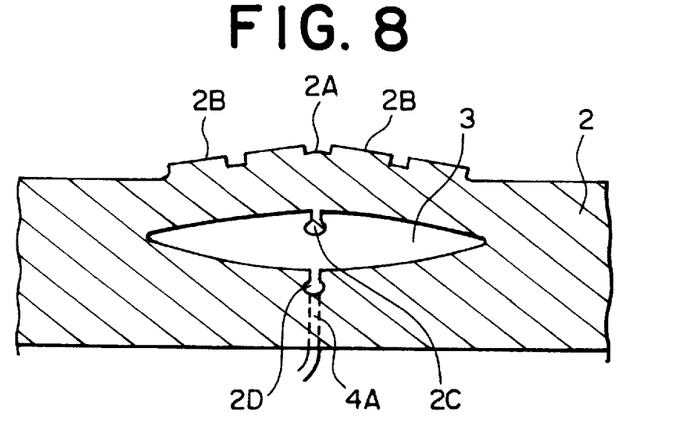
FIG. 8 is a fragmentary circumferential cross-sectional view illustrating the tire shown in FIG. 7 being in a different operative position.
Figure 9:
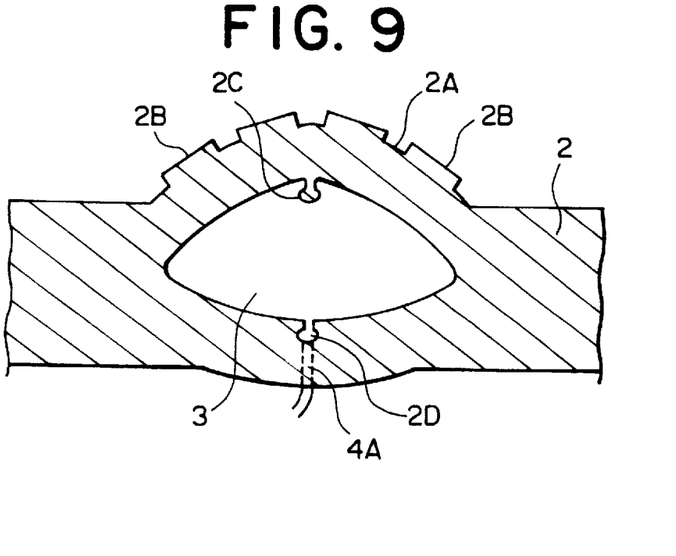
FIG. 9 is a fragmentary circumferential cross-sectional view illustrating the tire shown in FIG. 7 being in a further different operative position.
Figure 10:
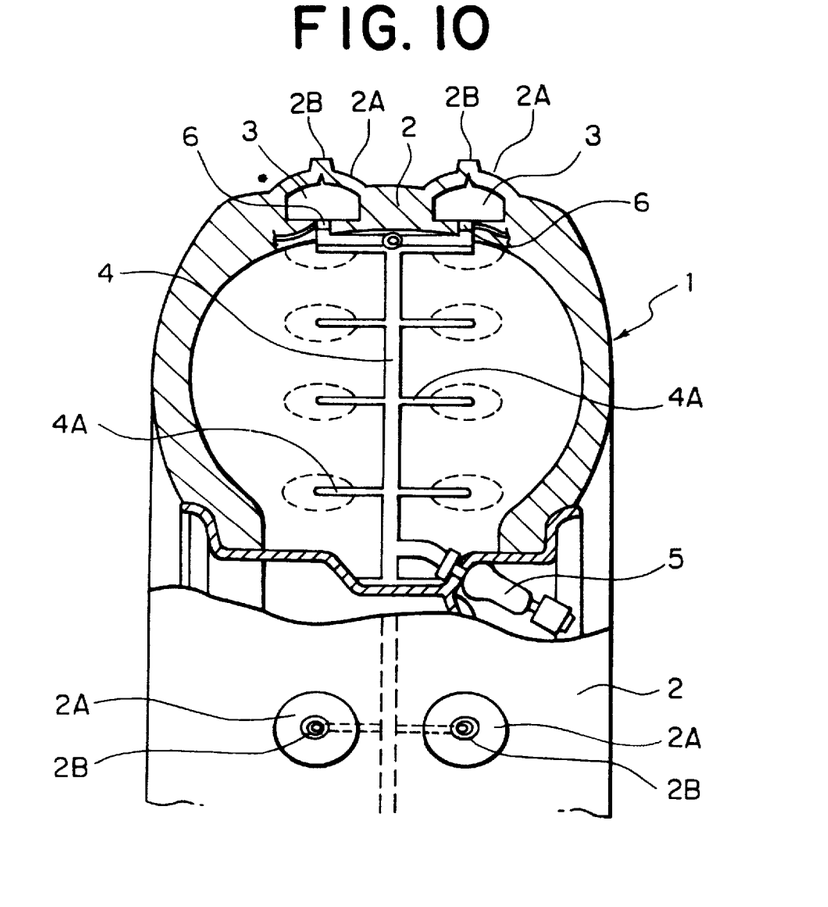
FIG. 10 is a fragmentary front view, partly in radial cross-section, illustrating a modified form of the first embodiment of the tire having the anti-skidding function according to the invention as set forth in claim 2.
Figure 11:
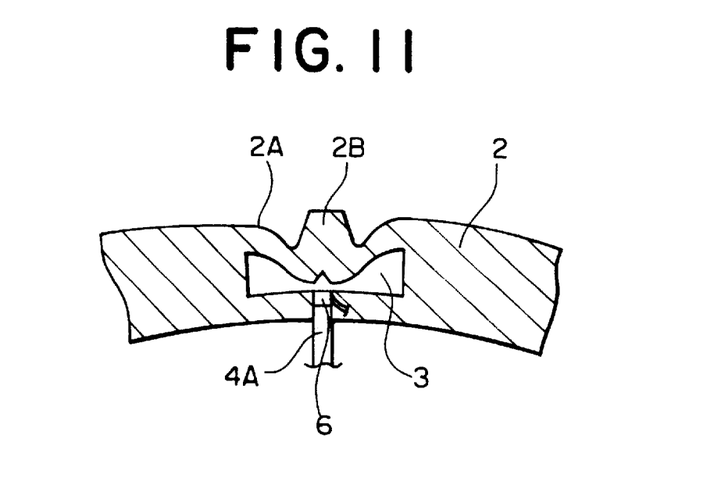
FIG. 11 is an enlarged fragmentary circumferential cross-sectional view illustrating the tire shown in FIG. 10 being in a first operative position.
Figure 12:
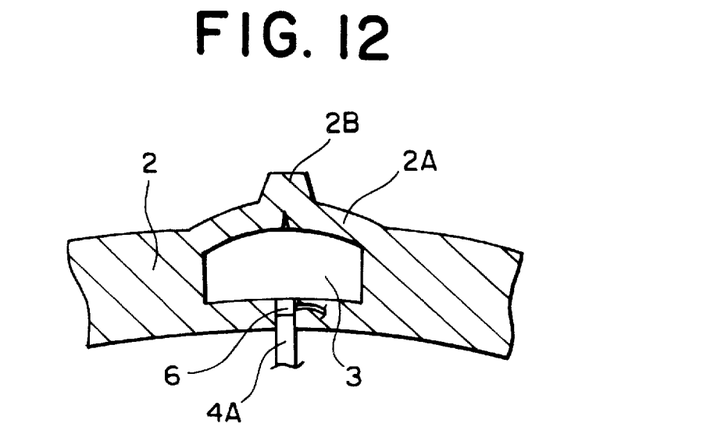
FIG. 12 is an enlarged fragmentary circumferential cross-sectional view illustrating the tire shown in FIG. 10 in a second operative position.
Figure 13:
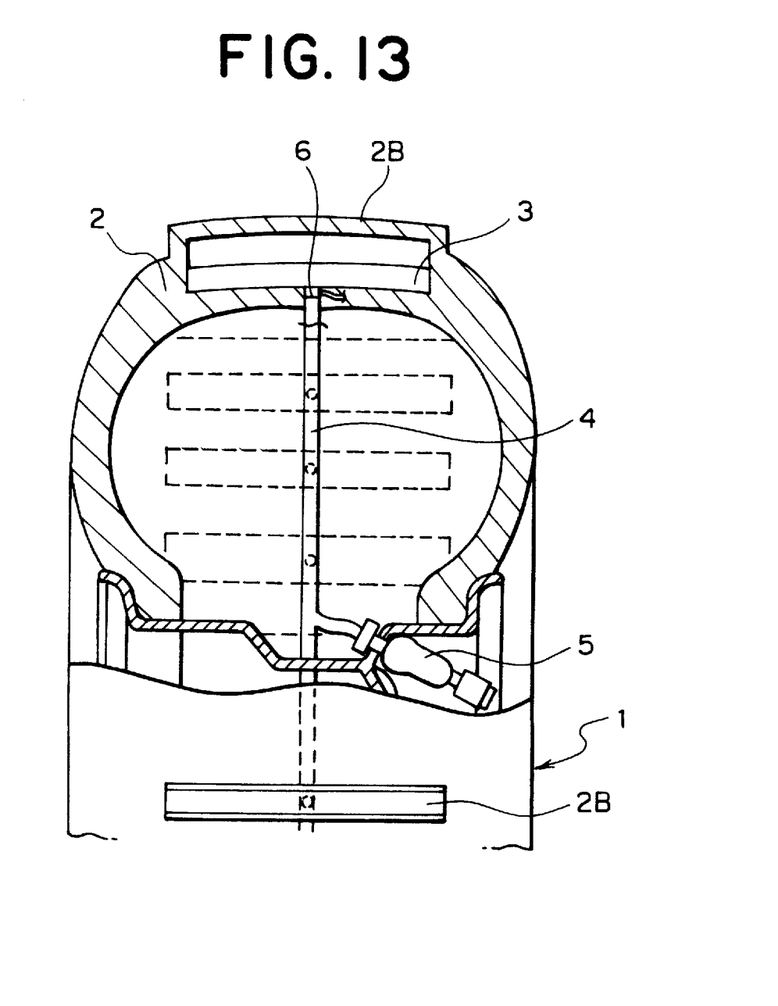
FIG. 13 is a fragmentary front view, partly in radial cross-section, illustrating a modified form of the second embodiment of the tire having the anti-skidding function according to the invention as set forth in claim 2.
Figure 14:
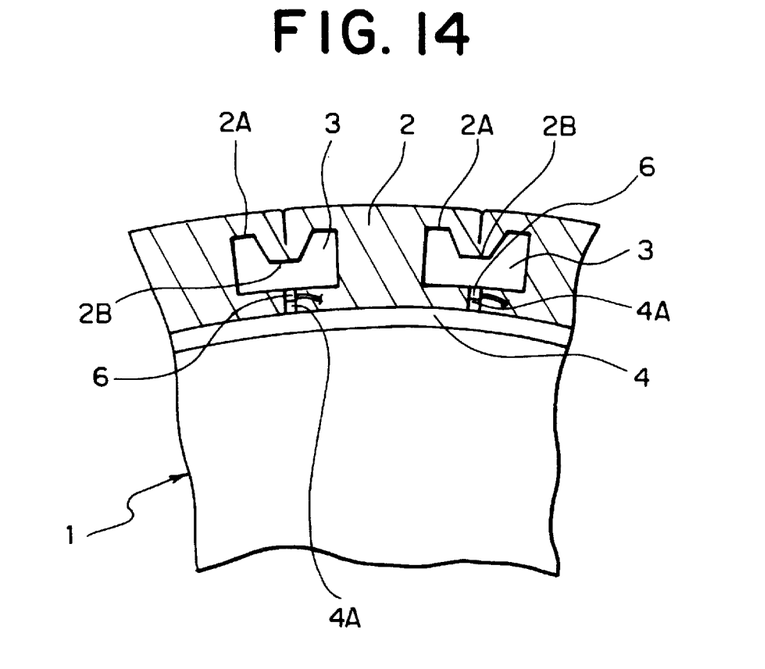
FIG. 14 is an enlarged fragmentary circumferential cross-sectional view illustrating the tire shown in FIG. 13 being in a first operative position.
Figure 15:
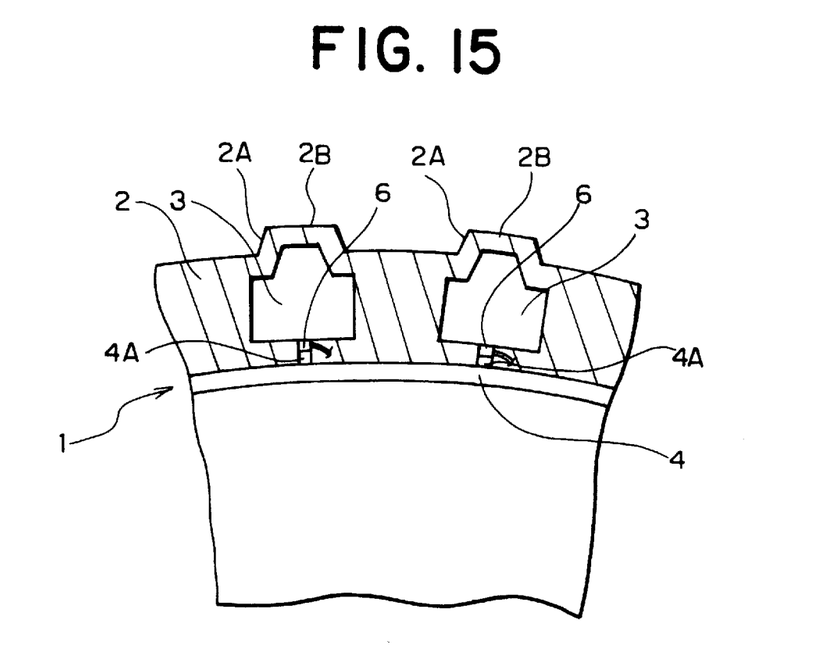
FIG. 15 is an enlarged fragmentary circumferential cross-sectional view illustrating the tire shown in FIG. 13 in a second operative position.
Figure 16:
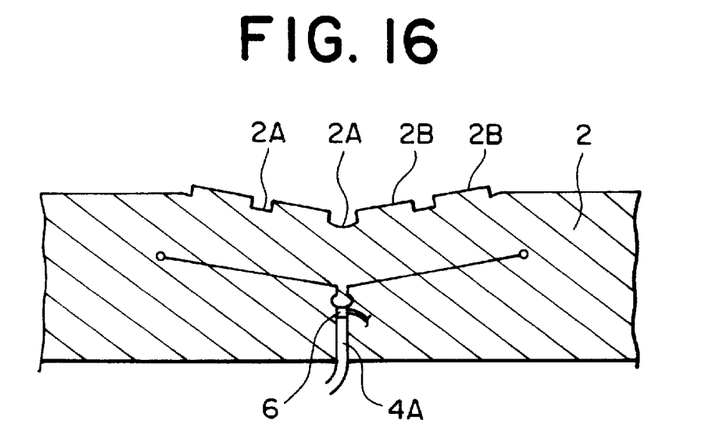
FIG. 16 is a fragmentary circumferential cross-sectional view illustrating a modified form of the third embodiment of the invention as set forth in claim 2, showing the tire being in a first operative position.
Figure 17:
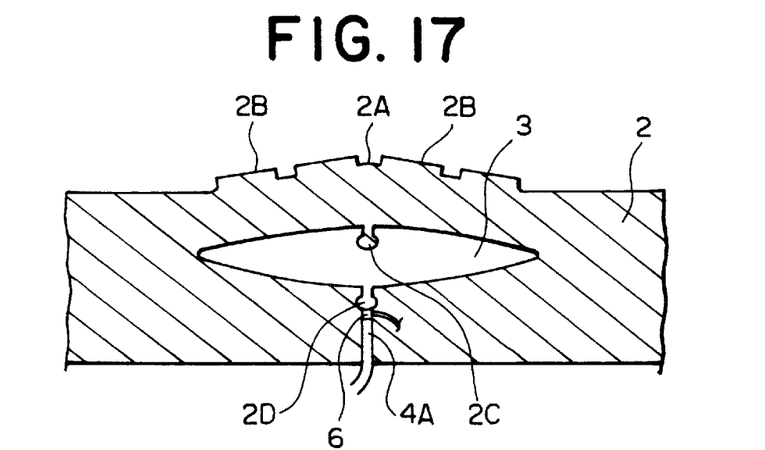
FIG. 17 is a fragmentary circumferential cross-sectional view illustrating the tire shown in FIG. 16 being in a different operative position.
Figure 18:
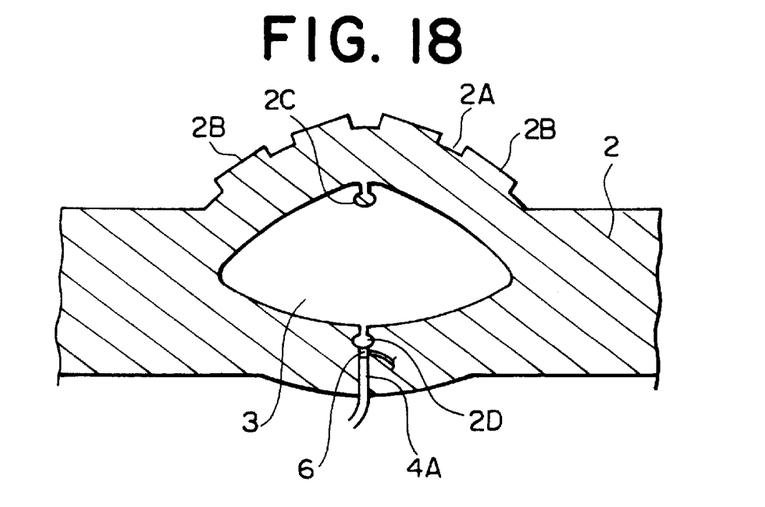
FIG. 18 is a fragmentary circumferential cross-sectional view illustrating the tire shown in FIG. 16 being in a further different operative position.
Figure 19:
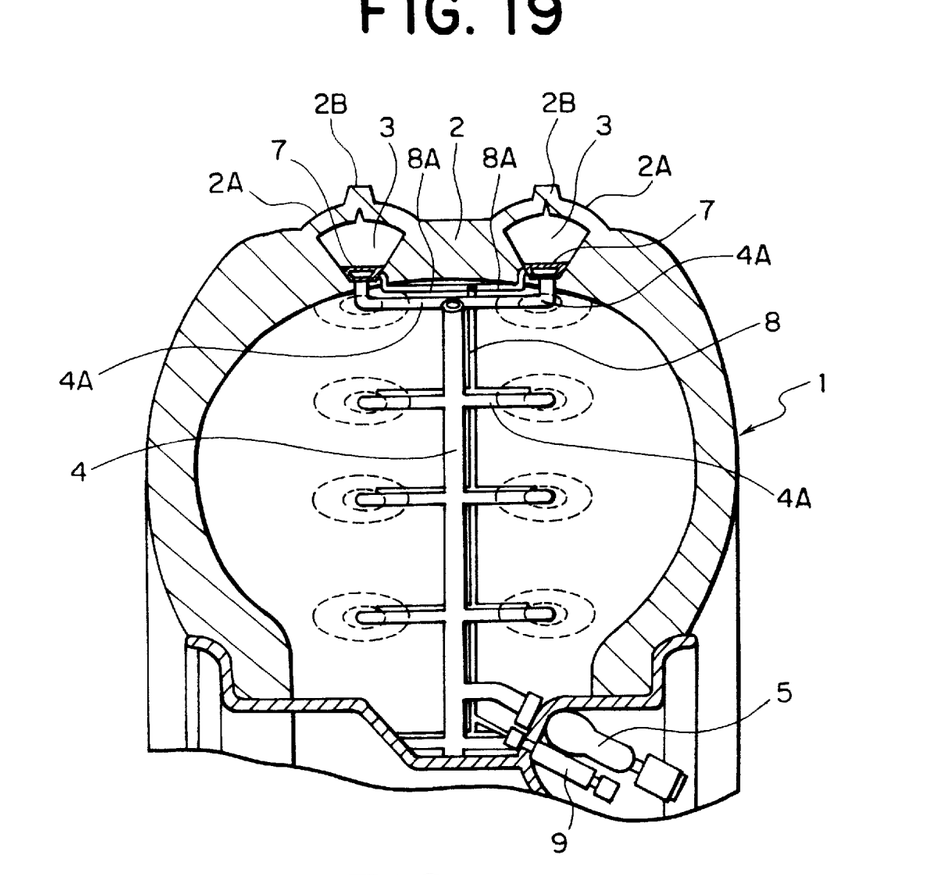
FIG. 19 is a fragmentary front view, partly in radial cross-section, illustrating an embodiment of the tire having the anti-skidding function according to the invention as set forth in claim 3.
Figure 20:
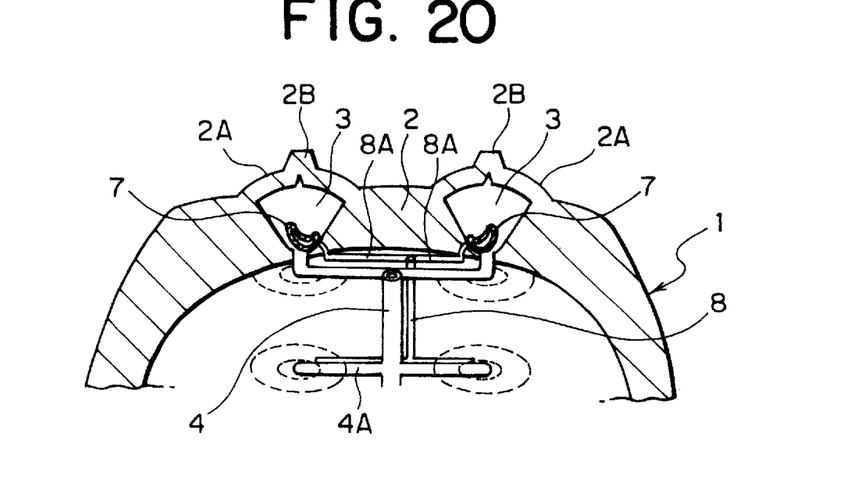
FIG. 20 is an enlarged, fragmentary, circumferential cross-sectional view illustrating the tire shown in FIG. 19 being in a first operative position.

FIG. 1 is a fragmentary front view, partly in radial cross-section, illustrating a first embodiment of the tire having the anti-skidding function according to the invention as set forth in claim 1; FIG. 2 is an enlarged fragmentary circumferential cross-sectional view illustrating the tire shown in FIG. 1 with portions of the tread in their collapsed position; FIG. 3 is an enlarged fragmentary circumferential cross-sectional view illustrating the tire shown in FIG. 1 with portions of the tread in their bulged position; FIG. 4 is a fragmentary front view, partly in radial cross-section, illustrating a second embodiment of the invention; FIG. 5 is an enlarged fragmentary circumferential cross-sectional view illustrating the tire shown in FIG. 4 with portions of the tread in their collapsed position; FIG. 6 is an enlarged fragmentary circumferential cross-sectional view illustrating the tire shown in FIG. 4 with portions of the tread in their bulged position; FIGS. 7 to 9 are fragmentary, circumferential cross-sectional views illustrating a third embodiment of the invention; FIG. 10 illustrates the tire of FIG. 1 having an on-off valve added thereto; FIG. 11 illustrates the tire of FIG. 2 having an on-off valve added thereto; FIG. 12 illustrates the tire of FIG. 3 having an on-off valve added thereto; FIG. 13 illustrates the tire of FIG. 4 having an on-off valve added thereto; FIG. 14 illustrates the tire of FIG. 5 having an on-off valve added thereto; FIG. 15 illustrates the tire of FIG. 6 having an on-off valve added thereto; FIG. 16 illustrates the tire of FIG. 7 having an on-off valve added thereto; FIG. 17 illustrates the tire of FIG. 8 having an on-off valve added thereto; FIG. 18 illustrates the tire of FIG. 9 having an on-off valve added thereto; and FIGS. 19 and 20 are fragmentary circumferential cross-sectional views illustrating an embodiment of the tire having the anti-skidding function according to the invention as set forth in claim 3.

The first embodiment of the tire according to the invention will now be described with reference to FIGS. 1 to 3 wherein 1 is a tire and 2 is the tread of the tire. Formed in the tread 2 are air chambers 3 which are arranged in two rows extending circumferentially of the tire 1.

The air chambers 3 are each circular in plan, and the tread surface side wall portion 2A defining a part of each of the air chambers 3 is formed with some allowance for slack such that the tread surface side wall portion 2A is bulged out toward the tread surface and collapsed into the air chamber 3 when the air chamber 3 is inflated with air pressure and when the air chamber is evacuated of the air, respectively.

The tread surface side wall portion 2A has a frustoconical thickened boss 2B extending from the outer surface thereof, making the rest of the wall portion 2A relatively thin-walled.

An air supply and evacuation tube 4 is provided inside of the tread 2 centrally thereof so as to extend circumferentially on the tire and is connected through branch tubes 4A with the respective air chambers 3 disposed on opposite sides of the air supply and evacuation tube 4. The air supply and evacuation tube 4 is provided in its inlet/outlet port with an air valve 5.

FIGS. 10 to 12 represent a modified embodiment of the tire shown in FIGS. 1 to 3 in which an on-off valve 6 is added in the connection between each of the air chambers 3 and the corresponding branch tube 4A of the air supply and evacuation tube 4. In FIGS. 10 to 12, corresponding reference numerals are used for those components which correspond to components shown in FIGS. 1 to 3.

The on-off valve 6 is opened both when the air chamber 3 is filled with air through the air supply and evacuation tube 4 and the branch tube 4A and when the air chamber 3 is evacuated of the air. The valve 6 is closed to seal off the air chamber 3 when the tire is used as a snow tire.

Next, the second embodiment of the tire according to the invention will be described with reference to FIGS. 4 to 6 in which corresponding reference numerals are used for those components which correspond to components shown in FIGS. 1 to 3.

In the second embodiment, a plurality axially elongated rectangular air chambers 3 are formed in the tread 2 in a single circumferential row at equal intervals spaced circumferentially of the tire 1. It will be seen from FIGS. 4 to 6, and particularly FIGS. 5 and 6 that in this embodiment the air chambers 3 are more closely spaced circumferentially of the tire 1 than in the first embodiment shown in FIGS. 1 to 3.

The tread surface side wall portion 2A defining a part of each of the air chambers 3 has a boss 2B extending from the outer surface thereof and longitudinally along the central portion thereof is formed such that the boss 2B is bulged out toward the tread surface and collapsed into the air chamber 3 when the air chamber 3 is inflated with air pressure and when the air chamber is evacuated of the air, respectively.

Both the tread surface side wall portion 2A and the boss 2B have a relatively thin wall thickness. An air supply and evacuation tube 4 is provided inside of the tread 2 centrally thereof so as to extend circumferentially of the tire and is connected through branch tubes 4A with the respective air chambers 3.

FIGS. 13 to 15 represents a modified embodiment of the tire shown in FIGS. 4 to 6 in which an on-off valve 6 is added in the connection between each of the air chambers 3 and the corresponding branch tube 4A of the air supply and evacuation tube 4. In FIGS. 13 to 15, corresponding reference numerals are used for those components which correspond to components shown in FIGS. 4 to 6.

FIGS. 7 to 9 show a third embodiment of the tire according to the invention in which corresponding reference numerals are used for those components which correspond to components shown in FIGS. 1 to 3.

In the third embodiment, a plurality air chambers 3 are formed in the tread 2 at equal intervals spaced circumferentially of the tire 1.

FIG. 7 illustrates the tire in its normal tire mode of use in which the air chambers 3 are evacuated of the air. FIG. 8 shows the tire while the air chambers 3 are being supplied with air before being fully inflated, and FIG. 9 illustrates the tire in its snow tire mode of use in which the air chambers 3 are filled with air.

Each of the air chambers 3 has a projection 2C extending from the ceiling wall thereof and a mating recess 2D formed in the floor wall thereof. The projection 2C is adapted to be removably snapped into the recess 2D during the normal tire mode of use.

FIGS. 16 to 18 represent a modified embodiment of the tire shown in FIGS. 7 to 9 in which an on-off valve 6 is added in the connection between each of the air chambers 3 and the corresponding branch tube 4A of the air supply and evacuation tube 4. In FIGS. 16 to 18, corresponding reference numerals are used for those components which correspond to components shown in FIGS. 7 to 9.

FIGS. 19 and 20 illustrates an embodiment of the invention as set forth in claim 3. In FIGS. 19 and 20, corresponding reference numerals are used for those components which correspond to components shown in FIGS. 1 to 3.

In this embodiment, an on-off valve in the form of a bladder 7 is provided in each of the air chambers 3 where the chambers are connected with the corresponding branch tube 4A of the air supply and evacuation tube 4. FIG. 19 illustrates the bladder 7 inflated with air while FIG. 20 illustrates the bladder 7 deflated or evacuated of the air.

The bladder 7 is formed of a material such as soft rubber or synthetic resin, and is configured to assume an inverted frustoconical shape to constitute a plug for the end of the corresponding branch tube 4A of the air supply and evacuation tube 4 when the bladder 7 is inflated with air.

It will thus be appreciated that when it is desired to fill the air chambers 3 with air to switch the tire into the snow tire mode of use, the bladders 7 are evacuated of the air into their deflated state to open the associated flow paths, followed by introducing air from the air supply and evacuation tube 4 into the air chambers 3. After the air chambers 3 are filled with air, the bladders 7 are filled with air into their inflated state to plug the corresponding branch tubes 4A of the air supply and evacuation tube 4 to thereby shut off the air chambers 3 from the branch tubes 4A, sealing the air chambers.

When the tire is used in the normal tire mode of use after the snow-falling season, the bladders 7 are evacuated of the air into their deflated state to establish fluid communication between the air chambers 3 and the corresponding branch tubes 4A of the air supply and evacuation tube 4, followed by evacuating the air chambers 3 of the air through the air supply and evacuation tube 4 to thereby cause the bosses 2B to collapse into the air chambers 3.

A valve actuating air tube 8 for controlling the operation of the bladder valves is provided inside of the tread 2 so as to extend circumferentially of the tire and is connected through branch tubes 8A with the respective bladders 7 disposed in the air chambers. The valve actuating air tube 8 is provided in its inlet/outlet port with an air valve 9.

EFFECTS OF THE INVENTION

As discussed hereinabove, the tire according to this invention may be used as a snow tire during snow-falling winter by introducing air into the air chambers to cause the bosses on the tread to project from the tread surface. Even if the car happens to encounter a snowless road during a travel on a snow-covered road, it may continue to run while the bosses are maintained in their projected position without causing dust or noise pollutions in contrast to the conventional metal spike pins. This eliminates the need for the troublesome operation for collapsing the bosses whenever a snowless road is encountered.

In addition, the bosses are not collapsed into the air chambers even if they are subjected to pressure by contacting the ground since the on-off valve means prevents the air in the air chambers from flowing out to cause a pressure drop in the chambers. It is thus insured that the bosses perform their anti-skidding function.

After the snow-falling season passes, the tire may be switched to the normal tire mode of use simply by evacuating the air chambers 3 of the air to allow the bosses 2B to collapse into the air chambers 3. This switching operation may be easily effected, requiring only the regulation of the air pressure without the need for using any tools. It is thus to be appreciated that the present invention provides a universal tire useful throughout all seasons which may be changed between the normal tire mode of use and tire the snow mode of use.

What is claimed is:

1. A tire having an anti-skidding function and including a tread having an outer tread surface, said tire comprising:

air chambers defined by peripheral walls formed in said tread, and an air supply and evacuation tube disposed inside of the tread, said air supply and evacuation tube being connected through a branch tube with each of said chambers, said tread surface having bosses extending outwardly therefrom at locations corresponding to those portions of the peripheral walls of said chambers facing said tread surface, said bosses bulging from or depressing into said tread surface depending on air pressure in said chambers, an on-off valve means being provided in each connecting portion between said air chambers and said air supply and evacuation tube.

2. A tire having an anti-skidding function and including a tread having an outer tread surface, said tire comprising:

air chambers defined by peripheral walls formed in said tread, and an air supply and evacuation tube disposed inside of the tread, said air supply and evacuation tube being connected through a branch tube with each of said chambers, said tread surface having bosses extending outwardly therefrom at locations corresponding to those portions of the peripheral walls of said chambers facing said tread surface, said bosses bulging from or depressing into said tread surface depending on air pressure in said chambers, an on-off valve means being provided in each of said respective chambers, each on-off valve means comprising bladder means adapted to be inflated with air to thereby seal the chamber associated with each on-off valve means, and a valve actuating air-tube being disposed inside the tread and connected with a respective bladder means.

* * * * *